(12) United States Patent
Cosendey et al.

(10) Patent No.: US 10,657,856 B2
(45) Date of Patent: May 19, 2020

(54) PHOTOSENSOR SYSTEMS FOR LENS DETECTION

(71) Applicant: North Inc., Kitchener (CA)

(72) Inventors: Gatien Cosendey, Châtel-St-Denis (CH); Nicolas Abele, Lausanne (CH)

(73) Assignee: North Inc., Kitchener, Ontario (CA)

( * ) Notice: Subject to any disclaimer, the term of this patent is extended or adjusted under 35 U.S.C. 154(b) by 0 days.

(21) Appl. No.: 15/857,329

(22) Filed: Dec. 28, 2017

(65) Prior Publication Data

US 2019/0043393 A1 Feb. 7, 2019

(51) Int. Cl.
  *G09G 3/00* (2006.01)
  *G02B 27/01* (2006.01)
  *G02C 11/00* (2006.01)

(52) U.S. Cl.
  CPC ......... *G09G 3/002* (2013.01); *G02B 27/0172* (2013.01); *G02B 2027/014* (2013.01); *G02B 2027/0178* (2013.01); *G02C 11/10* (2013.01); *G09G 2320/0626* (2013.01); *G09G 2360/144* (2013.01)

(58) Field of Classification Search
  CPC .............. G02B 27/017; G02B 27/0172; G02B 27/0174; G02B 27/0176; G02B 27/0178; G02B 2027/0178; G09G 3/002; G09G 2320/0626
  See application file for complete search history.

(56) References Cited

U.S. PATENT DOCUMENTS

| | | | |
|---|---|---|---|
| 2012/0098819 A1* | 4/2012 | Furuya | G02B 5/32 345/212 |
| 2015/0009550 A1* | 1/2015 | Misago | B60K 35/00 359/205.1 |
| 2019/0086670 A1* | 3/2019 | Ishida | G02B 27/0172 |

* cited by examiner

*Primary Examiner* — Xuemei Zheng
(74) *Attorney, Agent, or Firm* — Thomas Mahon

(57) ABSTRACT

Methods, apparatus, systems and articles of manufacture of a photosensor fusion system for lens detection are disclosed herein. An example apparatus includes a projector, a photosensor having a filter and a lens detector to compare an output from the photosensor to a threshold, and a projector controller to selectively enable or disable the projector based on the comparison between the output from the photosensor and the threshold.

20 Claims, 9 Drawing Sheets

PHOTOSENSOR SYSTEMS FOR LENS DETECTION

FIELD OF THE DISCLOSURE

This disclosure relates generally to augmented reality head-wearable displays, and, more particularly, to photosensor systems for lens detection.

BACKGROUND

See-through, augmented-reality head-wearable devices (HWDs) based on free-space projection optics require a combiner lens (e.g., glass) to redirect projected light beams toward the eye of the user. The proper usage of HWDs therefore requires that the combiner lens is, in fact, inserted into the frame. In some examples, the lens may be broken and may have fallen out. In other examples, the lens may be swappable (e.g., multiple lenses may have multiple dimming shades for use in indoor and outdoor environments) and is currently out of the frame. In such examples, there is no surface to redirect the light beams projected by the projector and, therefore, the light beams are cast through an opening in which the lenses were once disposed.

Figure 1:
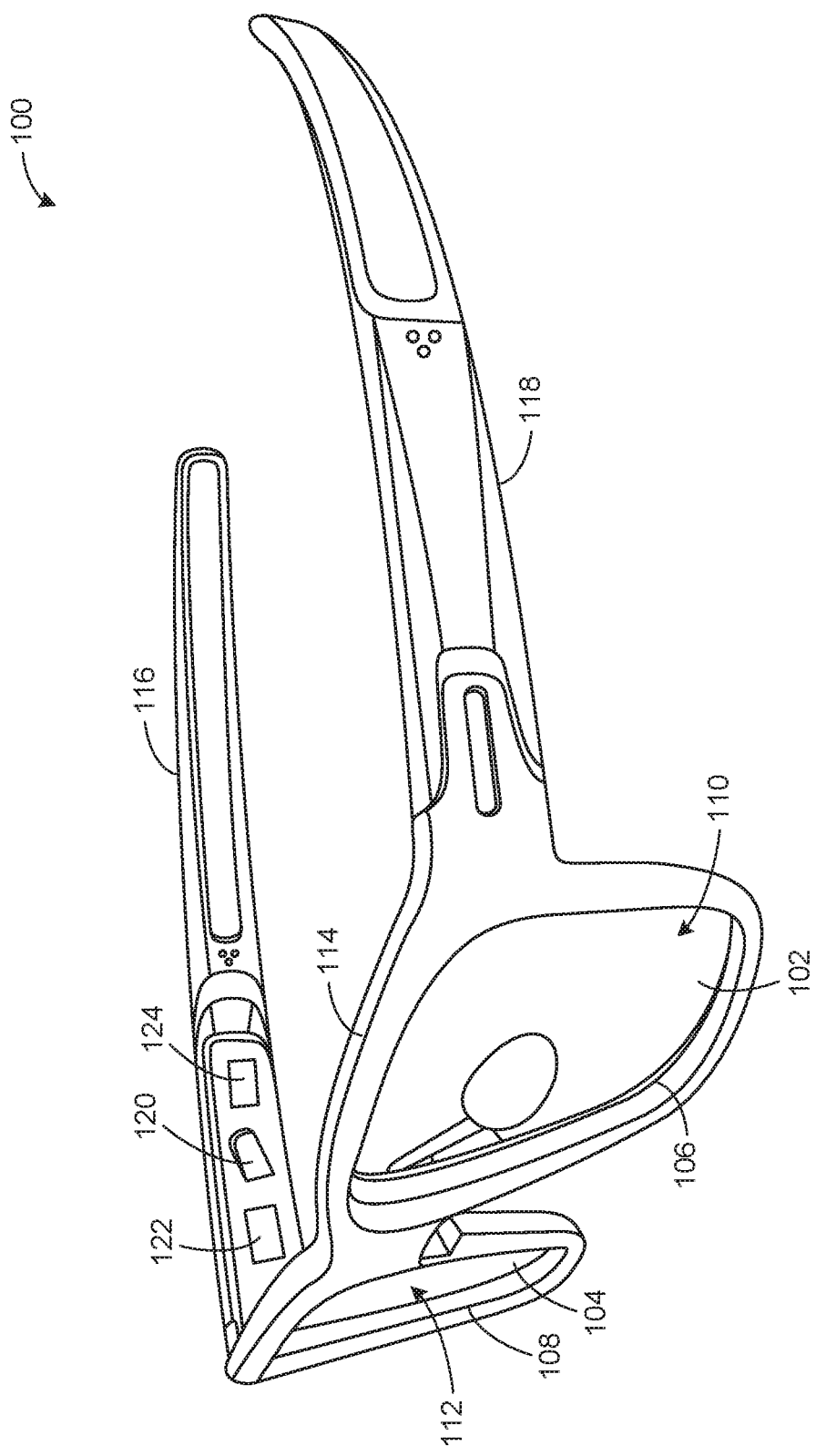
FIG. 1 is an example head-wearable device that may be used in connection with the teachings of this disclosure.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Augmented reality head-wearable devices (HWDs) based on free-space projection optics require a combiner lens/glass to redirect projected light beams toward the eye of the user. Thus, such devices require the lens(es) to be inserted in the frame of the HWD to ensure proper usage. In some instances, the lens(es) may not be inserted in the frame of the HWD. Such instances include a lens breaking, swapping lenses based on environment (e.g., clear lenses for indoor conditions, yellow lenses for low-visibility, tinted/mirror lenses for bright, outdoor conditions, etc.), or swapping lenses as required by the projection technology. In such instances, the light beam projected by the projector casts through an opening of the frame. The projected light may cause discomfort to people facing the HWD wearer as the light shines into their eyes. Disclosed herein are methods and apparatus to check the presence of the lens in the HWD.

An example apparatus disclosed herein includes a projector, a photosensor having a filter, a lens detector to compare an output from the photosensor to a threshold, and a projector controller to selectively enable or disable the projector based on the comparison between the output from the photosensor and the threshold.

An alternative example apparatus disclosed herein includes a head-wearable device, a projector coupled to the head-wearable device, a photosensor having a filter, a lens detector to compare an output from the photosensor to a threshold and to detect a lens disposed on the head-wearable display device, and a projector controller to selectively enable or disable the projector based on the output from the photosensor.

An example method disclosed herein includes detecting the presence of a lens in a head-wearable device, the head-wearable device including a projector and a photosensor having a filter. The example method further includes detecting an output from the first photosensor and selectively enabling or disabling the projector based on the output from the photosensor.

An example tangible machine-readable storage medium disclosed herein includes instructions which, when executed, cause a machine to at least detect presence of a lens in a head-wearable device by: comparing a first output of a first photosensor having a first filter to a second output of a second photosensor having a second filter and producing a relationship of the first and second outputs. The instructions, when executed, further cause a machine to determine if the relationship satisfies a threshold and enable a projector disposed on the head-wearable device in response to the relationship satisfying the threshold.

FIG. 1 is an example head-wearable device (HWD) 100 that may be used in connection with the teachings of this disclosure. The HWD 100 includes two lenses 102, 104 disposed in lens grooves 106, 108 outlining two openings 110, 112 in a frame 114. In some examples that are discussed further herein, the lenses 102, 104 may not be present. The HWD 100 further includes two arms 116, 118, that are intended to wrap around a head of a user so that the HWD can be worn as glasses. In some examples, the HWD 100 may resemble a different shape that can be worn on the head of a user (e.g., goggles). Further examples may include eyewear displays (e.g., a hat or visor having a display, etc.) in place of the HWD 100.

The HWD 100 of FIG. 1 further includes a projector 120 that projects media (e.g., video, images, text, etc.) onto at least one lens 102, 104. The projector 120 may be enabled or disabled depending on whether the lenses 102, 104 are in the lens grooves 106, 108. While in this example, only one projector 120 is disposed on the HWD 100, in other examples, the projector 120 may be disposed on each arm 116, 118.

FIG. 1 further includes a light sensor 122 disposed on the arm 116 of the HWD 100. The light sensor 122, which may be implemented as a light sensor chip, aids in the determination of whether the lenses 102, 104 are in the lens grooves 106, 108, and in turn, whether the projector 120 is enabled or disabled. Additionally, the light sensor 122 may be utilized for the purpose of correcting the display brightness as a function of ambient lighting conditions. In one example, the light sensor 122 includes two photosensors that are described below in connection with FIG. 3. In the illustrated example, the light sensor 122 is an ambient light sensor (ALS) chip. In other examples, the light sensor 122 may be any type of light sensor capable of detecting light and producing an output value associated with the detected light.

FIG. 1 also includes a processor 124 disposed on the arm 116 of the head-wearable device 100. The processor 124 is programmed with software instructions to use information from the light sensor 122 to determine if the lenses 102, 104 are present and to determine if the projector 120 is enabled or disabled. The programming of the processor 124 is described below in connection with FIG. 4.

In the illustrated example, the projector 120, the light sensor 122, and the processor 124 are separate elements disposed on the arm 116. However, in other examples, the projector 120, the light sensor 122, and the processor 124 may be combined and/or disposed on a different part of the head-wearable device 100. For example, the processor 124 may be disposed inside the projector 120 and the projector 120 may be disposed on the arm 118.

Figure 2:
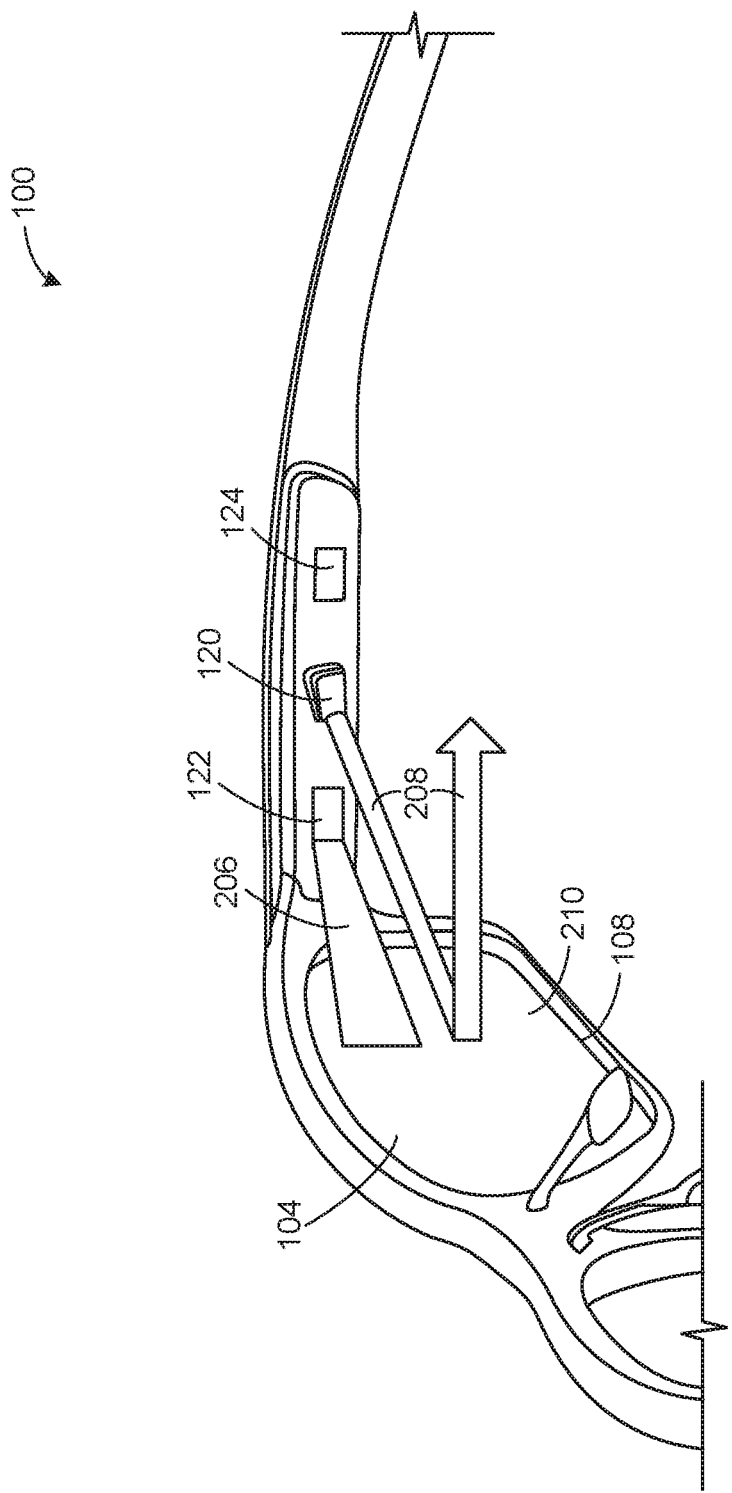
FIG. 2 is the head-wearable device of FIG. 1 including a detailed diagram illustrating the function of an example projector and an example light sensor of this disclosure.

FIG. 2 shows the head-wearable display device 100 of FIG. 1 including a detailed diagram illustrating the functions of the projector 120 and the light sensor 122 of the illustrated example. The light sensor 122 detects light from a first light path 206 that comes through the lens 104. The first light path 206 contributes to the determination of whether the projector 120 is enabled or disabled and is further discussed herein. In some examples, the lens 104 is not present. In such examples, the light sensor 122 still detects light from the first light path 206, but, in such instances, the light from the first light path 206 does not pass through the lens 104.

FIG. 2 also shows light travelling according to a second light path 208 that travels from the projector 120 to a first side 210 of the lens 104. In response to the lens 104 being in the lens groove 108, light according to the second light path 208 bounces off the first side 210 of the lens 104 and is visible to an eye of a user. However, as described herein, in response to the lens 104 being absent, the processor 124 disables the projector 120.

Figure 3:
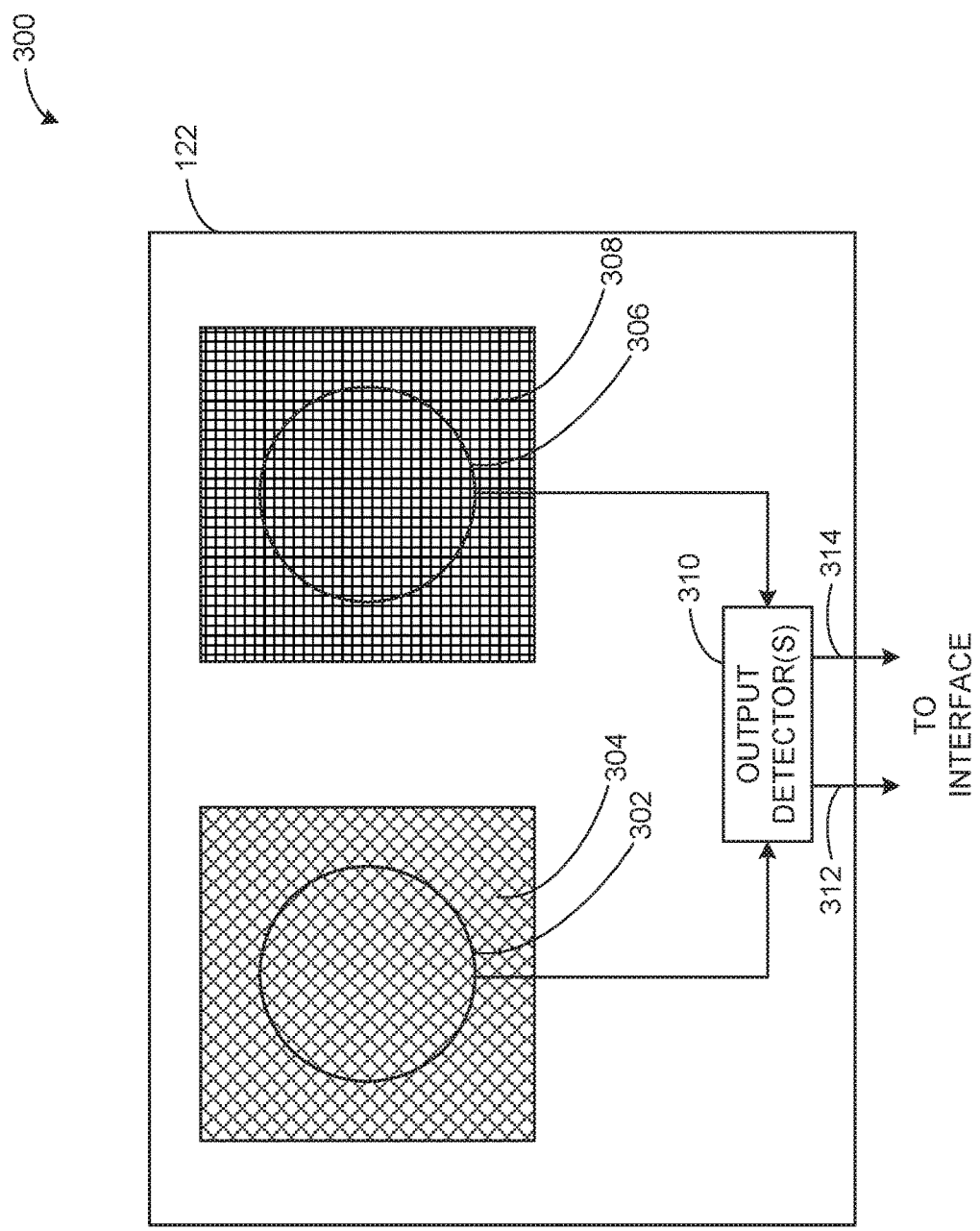
FIG. 3 is a diagram illustrating an example configuration of the light sensor of FIG. 1.

FIG. 3 is a diagram illustrating an example configuration 300 of the light sensor 122. The light sensor 122 includes a first photosensor 302 having a first filter 304 and a second photosensor 308 having a second filter 308. The light sensor 122 further includes one or more output detector(s) 310 that produces a first output 312 and a second output 314 from the first and second photosensors 302, 306 respectively and sends the first and second outputs 312, 314 to an interface 402 of FIG. 4.

In the illustrated example, the filter 304 is an ultra-violet A (UVA) shortpass filter. The UVA shortpass filter is useful as the filter 304 because the normalized spectral distribution of the UVA shortpass filter does not substantially overlap the normalized spectral distribution of light through the lens 104 (shown in FIG. 5). In some examples, the overlap of the UVA shortpass filter and the normal spectral distribution is approximately 10%. Therefore, in response to the lens 104 being present, the output measured by the output detector(s) 310 satisfies a threshold (e.g., between 0% and 10% of spectral transmittance overlap) (shown in FIG. 6A). For example, the lens 104 may block a range (below 390 nm) of wavelengths. Meanwhile, the UVA shortpass filter will produce an output not satisfying the threshold only for wavelengths below 390 nm. Thus, if the lens 104 is present, the UVA shortpass filter 304 will produce an output satisfying the threshold.

While the UVA shortpass filter 304 is particularly useful for the previously-mentioned reasons, any filter with a similar characteristic may be used in other examples. For example, an alternative filter may be a filter that detects light having a wavelength that is substantially blocked by the lens 104 if the lens 104 is present.

In the example of FIG. 3, the second filter 308 is a filter matching luminous efficiency function (LEF). While the filter 304 produces vastly different first outputs 312 depending on whether the lens 104 is present or absent, the filter 308 generally produces second outputs 314 that are similar if the lens 104 is present or absent. The second output 314 decreases in value slightly if the lens 104 is present, which is described below in connection with FIGS. 5-6B. Whether the lens 104 is present or absent, the output detector(s) 310 detects the output 314 from the second photosensor 306 and sends the output 314 to the interface 402 of FIG. 4. In some examples, the light sensor 122 with the second photosensor 306 including the filter 308 matching LEF are previously installed in the HWD 100 of FIG. 1 for dimming the brightness of the second light path 208 of FIG. 2 based on ambient light conditions. In other examples that do not include a previously installed light sensor 122, the first photosensor 302 may be the only photosensor used for lens detection in the HWD 100.

While a filter matching LEF is used as the filter 308 in this example, in other examples, the second filter 308 may be any filter that can produce a reference number for lens detection. The filters in this example are generic off-the-shelf coatings that are applied to the first and second photosensors 302, 306. In this example, the first and second filters 304, 308 appear to be larger than the first and second photosensors 302, 306, respectively, while in other examples, the first and second filters 304, 308 may be the same size as the first and second photosensors 302, 306.

Figure 4:
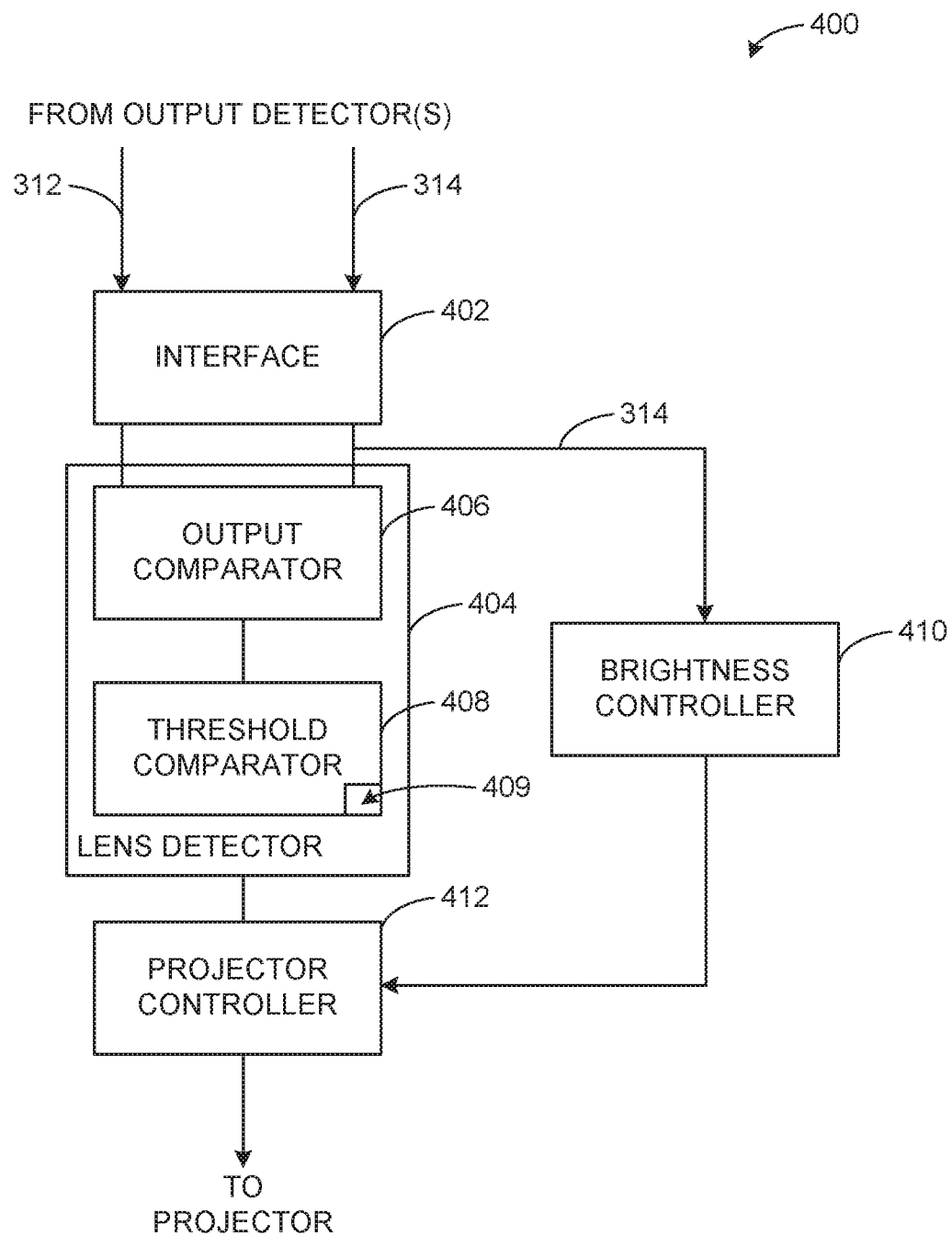
FIG. 4 is a block diagram illustrating an example configuration of the processor of FIG. 1.

FIG. 4 is a block diagram illustrating an example configuration of a lens-based projector controller 400 that may be implemented by the processor 124 of FIG. 1. The controller 400 includes an example interface 402, an example lens detector 404 which includes an example output comparator 406 and an example threshold comparator 408, an example brightness controller 410 and an example lens-based projector controller 412.

The example interface 402 of FIG. 4 accepts the first and second outputs 312, 314 from the output detector(s) 310 of FIG. 3. The interface 402 then passes the first and second outputs 312, 314 to the lens detector 404. The interface 402 also sends the second output 314 to the brightness controller 410. The interface 402 may be analog or digital, depending on the output of the output detector(s) 310 of FIG. 3.

The example lens detector 404 of FIG. 4 includes the example output comparator 406 and the example threshold comparator 408. The lens detector 404 receives the first and second outputs 312, 314 from the interface 402. The output comparator 406 compares the first output 312 and the second output 314 and determines a relationship between the first and second outputs 312, 314. The output comparator 406 may be any device that has the ability to produce a single value associated with a relationship between two received values. While this example includes two outputs 312, 314 that are being compared, other examples may only include one output. In such an example, the output comparator 406 may not be necessary. In other examples, the output comparator 406 may compare more than two outputs.

The threshold comparator 408 within the lens detector 404 compares the relationship determined by the output comparator 406 with a threshold 409. The threshold 409 in this example is substantially (within 10% of) zero. In response to the relationship satisfying the threshold, the threshold comparator 408 determines that the lens 104 is present. Conversely, in response to the relationship not satisfying the threshold, the threshold comparator 408 determines that the lens 104 is absent. The threshold comparator 408 may be any device that has the ability to compare a value with a threshold and produce a determination based on the comparison. In this example, the threshold comparator 408 compares the relationship produced by the output comparator 406 to the threshold 409. However, in other examples where the output comparator 406 may not be present, the threshold comparator 408 may compare the first output 312 to the threshold 409. Additionally, in further examples, the threshold 409 may be any threshold that corresponds with the type of filter(s) that is(are) used in FIG. 3.

Further illustrated in FIG. 4 is a brightness controller 410. The brightness controller 410 is typically previously installed in the HWD 100 and is not necessary for lens detection. The brightness controller 410 uses the second output 314 detected from the second photosensor 306 to dim and/or brighten the second light path 208 (shown in FIG. 2) based on ambient conditions. The brightness controller 410 may be any device that has the ability to compare the second output 314 with known values to determine if the second light path 208 should be dimmed or brightened. For example, the brightness controller 410 may use a look up table of known values that correspond to the second output 314 to determine if the display should be bright or dim. In further examples, the brightness controller 410 may use one or more thresholds to compare with the second output 314 or any other method to determine the ambient conditions.

The example lens-based projector controller 412 of FIG. 4 receives information from the lens detector 404 and the brightness controller 410. The lens-based projector controller 412 gives commands to the projector based on the information received. For example, in response to the lens detector 404 determining the lens 104 is present, the lens-based projector controller 412 enables the projector 120. In further examples, in response to the lens detector 404 determining the lens 104 is absent, the lens-based projector controller 412 disables the projector 120. In even further examples, if the lens-based projector controller 412 enables the projector 120, the lens-based projector controller 412 may dim and/or brighten the projector 120 based on the information received from the brightness controller 410. The lens-based projector controller 412 may be any device that has the ability to decipher information from other devices and determine what commands to give the projector 120.

The controller 400 of FIG. 4 functions as follows: the first and second outputs 312, 314 are sent from the output detector(s) 310 to the interface 402. Both the first and second outputs 312, 314 are sent to the output comparator 406 and the second output 314 is sent to the brightness controller 410. The first and second outputs 312, 314 are used to determine a relationship that is compared to the threshold 409 at the threshold comparator 408. The threshold comparator 408 uses the comparison to determine if the lens 104 is present or absent. If the lens 104 is present, the lens detector 404 communicates the information to the lens-based projector controller 412 which then enables the projector 120. In this instance, the brightness controller 410 also sends information to the lens-based projector controller 412 to dim and/or brighten the display on the lens 104 based on the ambient conditions communicated to the brightness controller 410 via the second output 314. If the lens 104 is determined to be absent by the lens detector 404, the lens detector 404 communicates the information to the lens-based projector controller 412 which then disables the projector 120.

Figure 5:
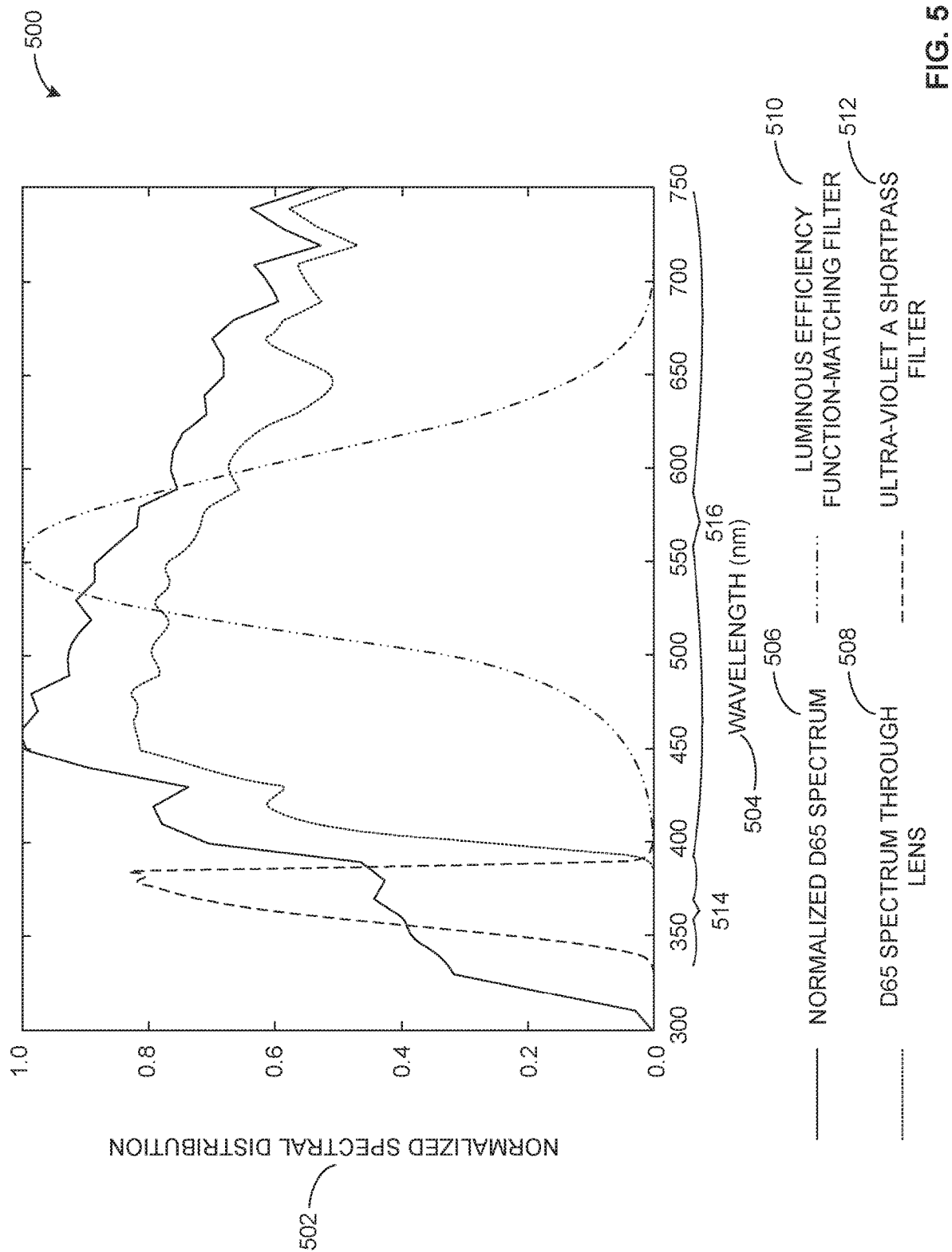
FIG. 5 is a graph illustrating normalized spectral distribution of light passing through filters and light passing through a lens at an example range of wavelengths.

FIG. 5 is a graph 500 illustrating normalized spectral distribution 502 of both light passing through filters (i.e., LEF-matching filter and UVA shortpass filter) and light passing through a lens (i.e., D65 spectrum through lens) and comparing those distributions with a normalized spectrum of light without a lens. The normalized spectral distribution 502 is measured at a range of wavelengths 504 for each of a normalized D65 spectrum 506, a D65 spectrum through a lens 508, an LEF-matching filter 510, and a UVA shortpass filter 512.

The normalized D65 spectrum line 506 of FIG. 5 shows the normalized spectral distribution 502 at a range of wavelengths 504 without the lens 104 in the lens groove 108. In other words, the normalized D65 spectrum line 506 is illustrative of the light passing through the openings 110, 112 without any obstacles, such as the lenses 102, 104.

The D65 spectrum through lens line 508 shows the normalized spectral distribution 502 at a range of wavelengths 504 with the lens 104 in the lens groove 108. For example, the D65 spectrum through lens line 508 is illustrative of the same light source as the normalized D65 spectrum line 506 passing through a lens. In this example, the D65 spectrum is based off of an approximation of the average midday light in western Europe.

The LEF-matching filter line 510 and the UVA shortpass filter line 512 each show the respective normalized spectral distribution for the LEF-matching filter 308 and the UVA shortpass filter 306 as the light source passes through each filter.

In this example, the HWD lenses are made of polycarbonate. Such lenses have a spectral transmittance that decreases to nearly zero below a wavelength of 390 nm as depicted by the D65 spectrum through lens line 508. This characteristic is used to determine whether the lenses 102, 104 are properly inserted in the lens grooves 106, 108. In other examples, the lenses 102, 104 may be made of any material that has a cutoff wavelength within the D65 spectral range (i.e., the spectrum decreases down to nearly zero below a wavelength within the normalized D65 spectrum). In such examples, the UVA shortpass filter 306 may be adapted to have a passband below the cutoff wavelength (i.e., there should be little or no overlap between the normalized D65 spectrum of the material of the lens and the normalized spectral distribution of the UVA shortpass filter 512).

The graph of FIG. 5 illustrates that the spectral transmittance of the UVA shortpass filter 512 does not substantially (i.e., 10%) overlap the normalized spectral distribution of the D65 spectrum through lens 508. In other words, in this example, a first wavelength range 514 of light passing through the lens read by the UVA shortpass filter 306 does not substantially (10%) overlap a second wavelength range 516 of polycarbonate. The lack of overlap between the normalized spectral distribution of the UVA shortpass filter 512 and the normalized spectral distribution of the D65 spectrum through lens 508 causes the relationship between the first and second outputs 312, 314 to satisfy the threshold (i.e., within 10% of zero) when the lens 104 is in the lens groove 108.

Conversely, there is a substantial overlap between the spectral transmittance of the UVA shortpass filter 512 and the normalized distribution of the D65 spectrum 506. This interaction causes the relationship between the first and second outputs 312, 314 to not satisfy the threshold 409 when the lens 104 is not in the lens groove 108. As shown in FIG. 5, the spectral transmittance of the LEF-matching filter 510 produces a number above 0.6 whether the lens 104 is in the lens groove 108 or the lens 104 is not in the lens groove 108. Thus, the light value ratio will produce a rational number, as the denominator will generally not be zero.

Figure 6A:
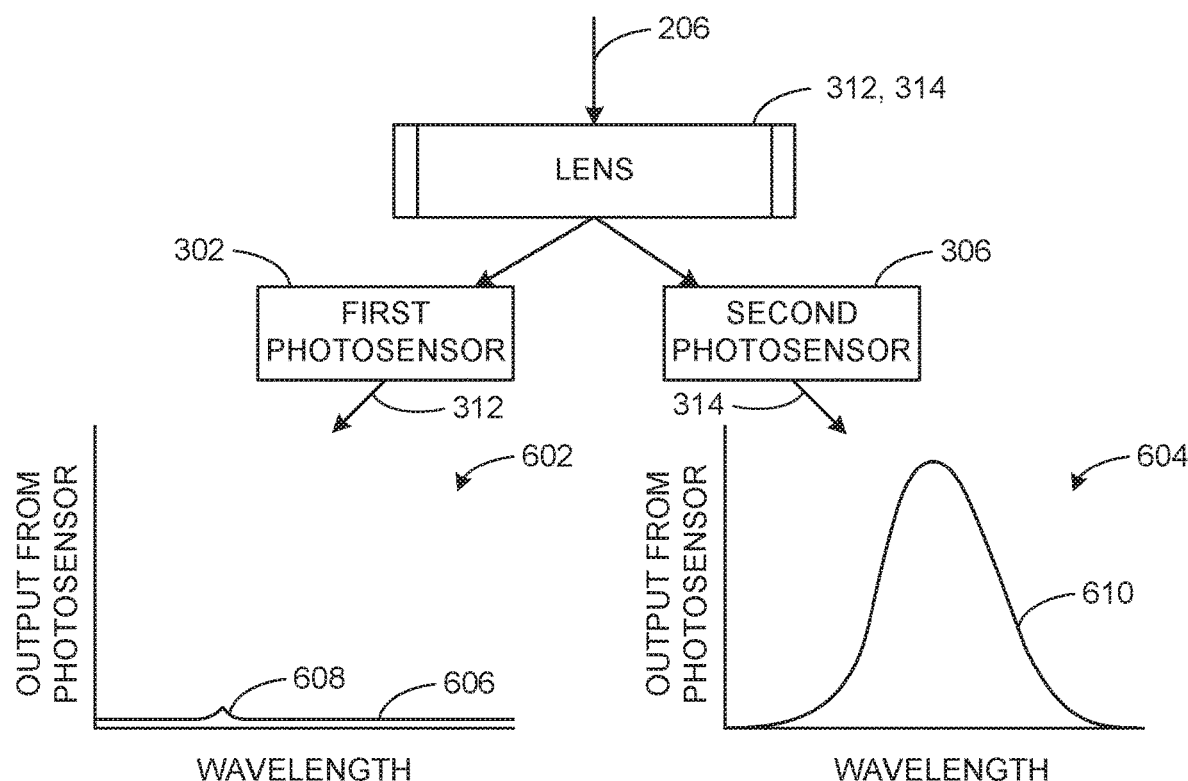
FIG. 6A is a graph illustrating the output from the photosensors of FIG. 3 in response to a lens being present.

FIG. 6A is two graphs 602, 604 illustrating the respective first and second outputs 312, 314 from the photosensors 302, 306 of FIG. 3 in response to the lens(es) 102, 104 being present. The first graph 602 illustrates the values of the first output 312 from the first photosensor 302. The first output line 606 shows that the first output 312 is substantially (10%) zero when the light path 206 passes through the lens(es) 102, 104. A crest 608 in the first output line 606 represents a small (e.g., less than 10%) portion of overlap between the UVA shortpass filter line 512 and the D65 spectrum through lens line 508 of FIG. 5.

The second graph 604 illustrates the values of the second output 314 from the second photosensor 306 when the lens(es) 102, 104 is present. The second output line 610 shows the second output 314 generally gives a value, causing the relationship between the first and second outputs 312, 314 to be a rational number as the denominator is not zero.

Figure 6B:
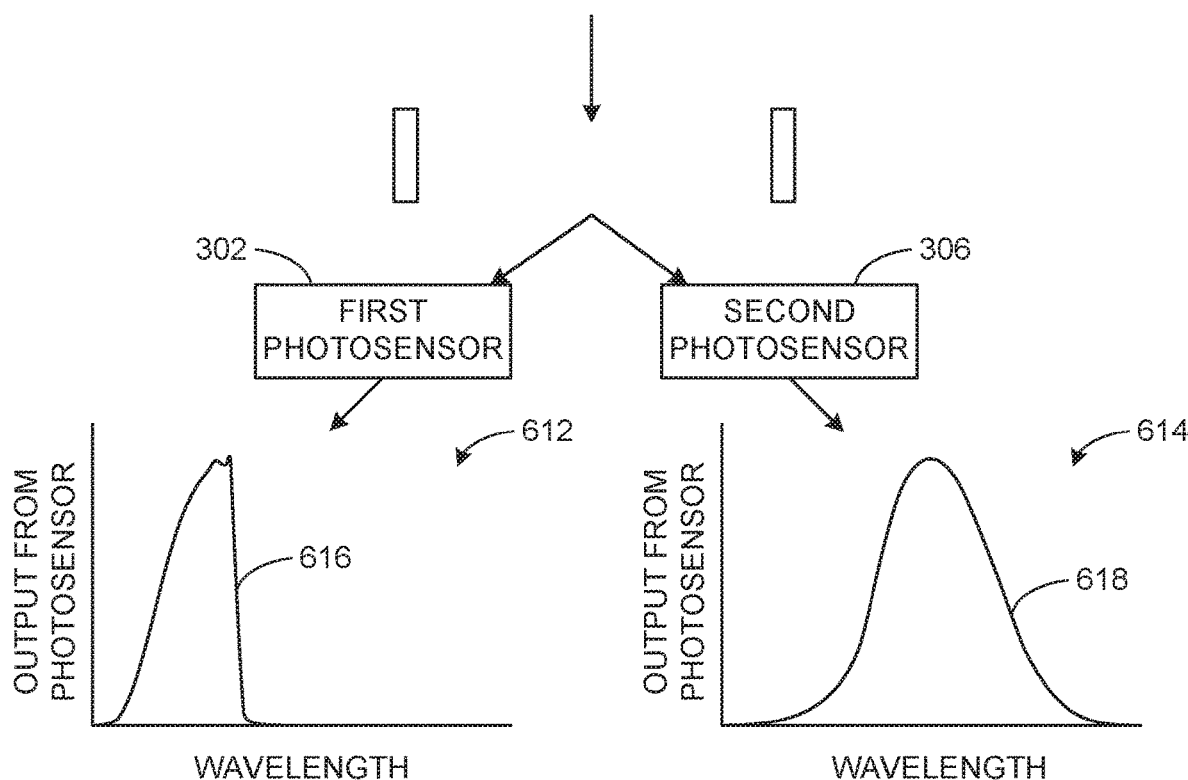
FIG. 6B is a graph illustrating the output from the photosensors of FIG. 3 in response to a lens being absent.

FIG. 6B is two graphs 612, 614 illustrating the first and second outputs 312, 314 from the photosensors 302, 306 of FIG. 3 in response to the lens(es) 102, 104 being absent. The third graph 612 illustrates the values of the first output 312 from the first photosensor 302. The first output line 616 shows the first output 312 is a value greater than zero for a portion of wavelengths that produced an output value of substantially zero in the first graph 602 when the lens is present.

The fourth graph 614 illustrates the values of the second output 314 from the second photosensor 306 when the lens(es) 102, 104 is (are) absent. The second output line 618 shows the second output 314 generally gives a value causing the relationship between the first and second outputs 312, 314 to be a rational number as the denominator is not zero.

The relationships between the first and second outputs 312, 314 in FIGS. 6A and 6B explain the threshold 409 of FIG. 4. As shown, the relationship between the first and second outputs 312, 314 with the lens 102, 104 present satisfies the threshold 409 because the numerator (e.g., the first output 312) is substantially zero. Thus, if the relationship between the first and second outputs 312, 314 is determined to be substantially zero, the threshold comparator 408 determines that the lens 102, 104 is present and enables the projector 120. Conversely, the relationship between the first and second outputs 312, 314 without the lens 102, 104 present does not satisfy the threshold 409 because the numerator (e.g., the first output 312) is not substantially zero. Thus, if the relationship between the first and second outputs 312, 314 is determined to not be substantially zero, the threshold comparator 408 determines that the lens 102, 104 is absent and disables the projector 120.

Figure 7:
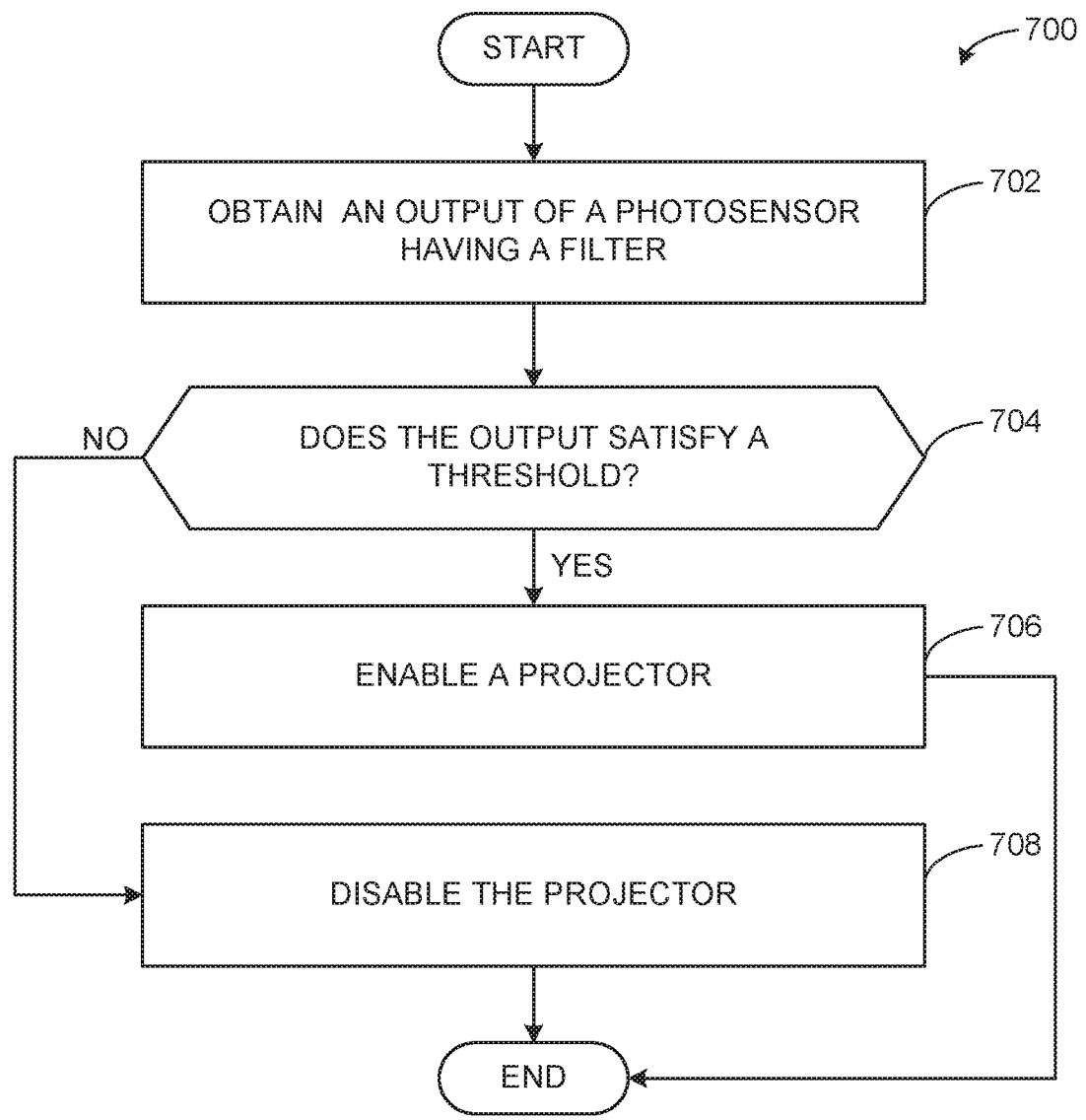
FIG. 7 is a flowchart representative of machine readable instructions which may be executed to implement the processor of FIG. 4.
Figure 8:
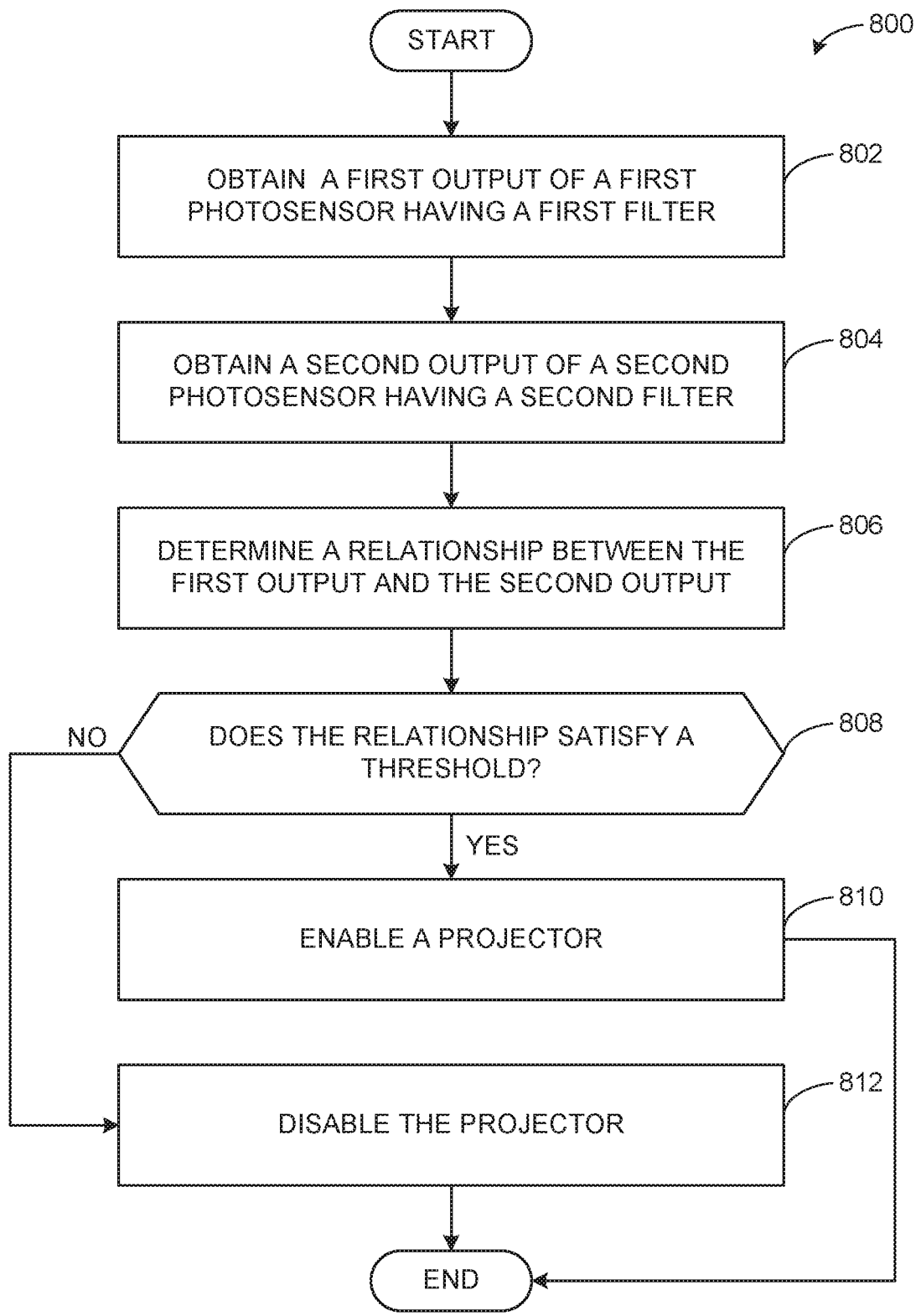
FIG. 8 is a flowchart representative of alternative machine readable instructions which may be executed to implement the processor of FIG. 4.

While an example manner of implementing processor of FIG. 4 is illustrated in FIGS. 7-8, one or more of the elements, processes and/or devices illustrated in FIGS. 7-8 may be combined, divided, re-arranged, omitted, eliminated and/or implemented in any other way. Further, the example interface 402, the example lens detector 404 which, in some examples may include the example output comparator 406 and the example threshold comparator 408, the example brightness controller 410, and the example lens-based projector controller 412 and/or, more generally, the example controller 400 of FIG. 4 may be implemented by hardware, software, firmware and/or any combination of hardware, software and/or firmware. Thus, for example, any of the example interface 402, the example lens detector 404 which, in some examples may include the example output comparator 406 and the example threshold comparator 408, the example brightness controller 410, and the example lens-based projector controller 412 and/or, more generally, the example controller 400 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example interface 402, the example lens detector 404 which, in some examples may include the example output comparator 406 and the example threshold comparator 408, the example brightness controller 410, and the example lens-based projector controller 412 is/are hereby expressly defined to include a non-transitory computer readable storage device or storage disk such as a memory, a digital versatile disk (DVD), a compact disk (CD), a Blu-ray disk, etc. including the software and/or firmware. Further still, the example controller 400 of FIG. 4 may include one or more elements, processes and/or devices in addition to, or instead of, those illustrated in FIGS. 7-8, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic or machine readable instructions for implementing the controller 400 of FIG. 4 is shown in FIGS. 7-8. The machine readable instructions may be a program or portion of a program for execution by a processor such as the processor 912 shown in the example processor platform 900 discussed below in connection with FIGS. 7-8. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIGS. 7-8, many other methods of implementing the example controller 400 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 1-8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

FIG. 7 is a flowchart representative of machine readable instructions which may be executed to implement the controller 400 of FIG. 4. The program of FIG. 7 starts at block 702, where the interface 402 obtains an output 312 of a photosensor 302 having a filter 304. In the illustrated example, the filter 304 is a UVA shortpass filter. However, in other examples, the filter 304 may be any filter that embodies similar, previously-mentioned characteristics as the UVA shortpass filter.

In response to the interface 402 obtaining an output 312, the threshold comparator 408 determines if the output 312 satisfies a threshold 409 at block 704. In this example, the threshold 409 is substantially (i.e., within 10% of) zero. In other examples, the threshold 409 may be closer or further from zero depending on the type of filter 304 that is used on the photosensor 302.

In response to the threshold comparator 408 determining that the output 312 satisfies the threshold 409, the lens-based projector controller 412 enables the projector 120 at block 706 and the process ends. In response to the threshold comparator 408 determining that the output 312 does not satisfy the threshold 409, the lens-based projector controller 412 disables the projector 120 at block 708 and the process ends.

FIG. 8 is a flowchart representative of alternative machine readable instructions which may be executed to implement the controller 400 of FIG. 4. The program of FIG. 8 starts at block 802, where the interface 402 obtains a first output 312 of a first photosensor 302 having a first filter 304. In the illustrated example, the filter 304 is a UVA shortpass filter. However, in other examples, the filter 304 may be any filter that embodies similar, previously-mentioned characteristics as the UVA shortpass filter.

After obtaining a first output 312, the interface 402 obtains a second output 314 of a second photosensor 306 having a second filter 308 at block 804. In this particular example, the second filter 308 is a filter matching LEF. However, in other examples, the second filter 308 may be any filter that can produce an output value for lens detection. Further, in this example, the interface 402 detects the first output 312 of the first photodiode 302 before the second output 314 of the second photodiode 306. However, in other examples, the interface 402 may detect the first and second outputs 312, 314 simultaneously. In even further examples, the interface 402 may detect the second output 314 before the first output 312.

After the first and second outputs 312, 314 are detected, at block 806, the output comparator 406 compares the first output 312 with the second output 314. The output comparator 406 determines a relationship between the first and second outputs 312, 314. Once the relationship is determined, the threshold comparator 408 determines if the relationship satisfies a threshold (e.g., within 10% of zero) 409 at block 808.

In response to the relationship satisfying the threshold 409, the lens-based projector controller 412 enables the projector 120 at block 810 and the process ends. Conversely, in response to the relationship not satisfying the threshold 409, the lens-based projector controller 412 disables the projector 120 at block 812 and the process ends.

In the illustrated example, the projector 120 starts in a neutral state and is neither enabled (block 810) nor disabled (block 812). However, in other examples, the projector 120 may start in an enabled state. In such examples, the flowchart 800 would not include block 810 and the state of the projector 120 would change in response to the relationship not satisfying the threshold 409 (block 812). In further examples, the projector 120 may start in a disabled state. In these examples, the flowchart 800 would not include block 812 and the state of the projector 120 would change in response to the relationship satisfying the threshold 409 (block 810).

While the example apparatuses, methods, and computer-readable medium disclosed herein include a head-worn display device, other projecting devices (e.g., a movie projector, a mobile device projector, etc.) may use the examples disclosed herein to determine if a lens is disposed in its proper position.

Figure 9:
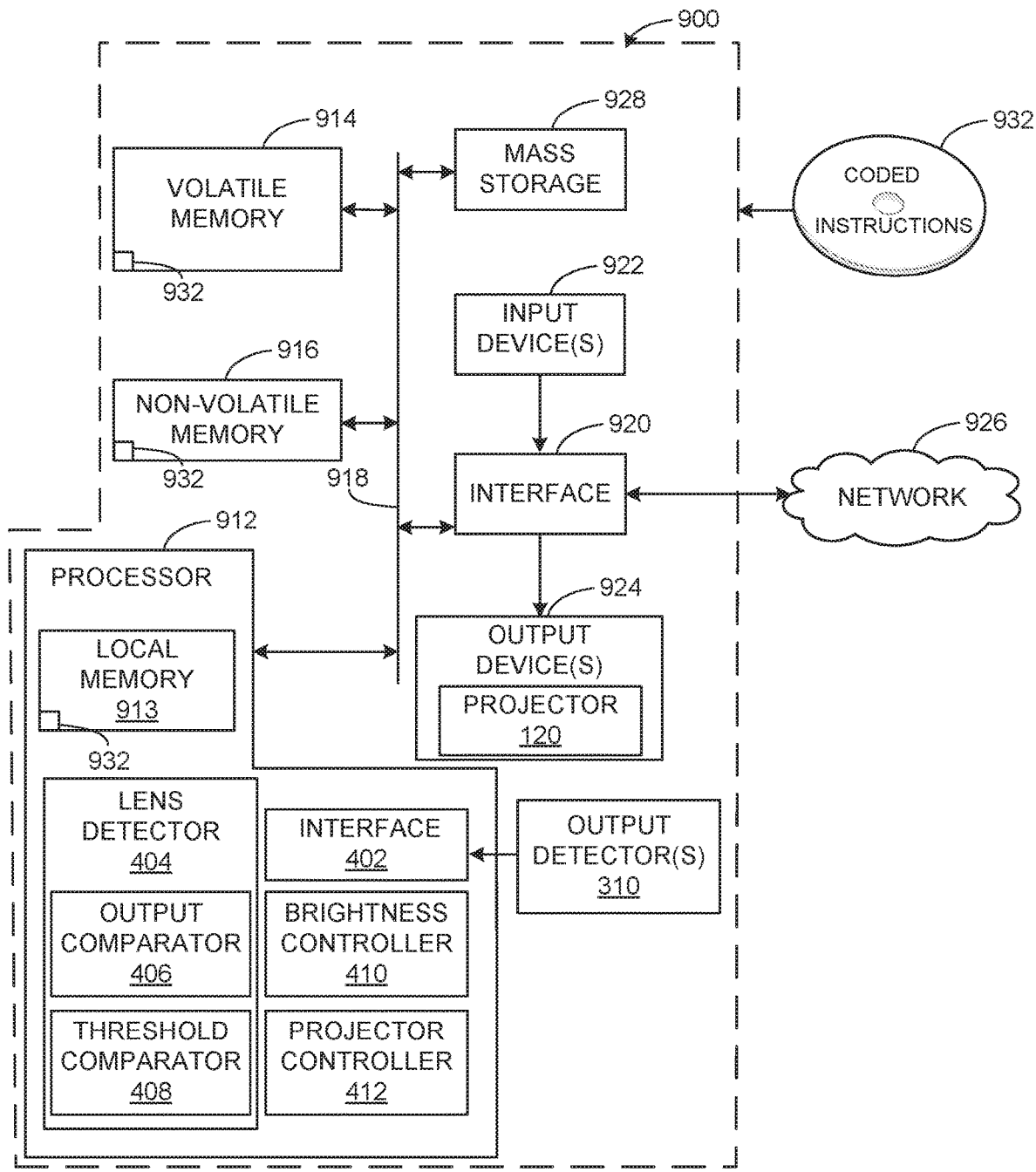
FIG. 9 is a block diagram of an example processing platform structured to execute the instructions of FIGS. 7-8 to implement the processor of FIG. 4.

FIG. 9 is a block diagram of an example processor platform 900 structured to execute the instructions of FIGS. 7-8 to implement the processor of FIG. 4. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device.

In this example, the processor implements the example interface 402, the example lens detector 404, the example output comparator 406, the example threshold comparator 408, the example brightness controller 410, and the example lens-based projector controller 412.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIGS. 7-8 may be stored in the mass storage device 928, in the volatile memory 914, in the non-volatile memory 916, and/or on a removable non-transitory computer readable storage medium such as a CD or DVD.

From the foregoing, it will be appreciated that example methods, apparatus and articles of manufacture have been disclosed that enable detecting the presence of HWD lenses and enabling/disabling the projector without having to modify the lenses. Circuitry is added to the frame of the HWD to electronically detect the lenses while using an element (i.e., the light sensor) that is already built into the system.

Example 1 includes an apparatus comprising a projector, a photosensor having a filter, a lens detector to compare an output from the photosensor to a threshold, and a projector controller to selectively enable or disable the projector based on the comparison between the output from the photosensor and the threshold.

Example 2 includes the apparatus of example 1, wherein the projector controller enables the projector in response to determining the output from the photosensor satisfies the threshold.

Example 3 includes the apparatus of example 2, wherein the threshold is a first threshold and the projector controller further dims the projector in response to the output from the photosensor satisfying a second threshold.

Example 4 includes the apparatus of example 1, wherein the projector controller disables the projector in response to determining the output from the photosensor does not satisfy the threshold.

Example 5 includes the apparatus of example 1, wherein the photosensor is a first photosensor, the filter is a first filter, and the output is a first output, further including a second photosensor having a second filter, the second photosensor producing a second output.

Example 6 includes the apparatus of example 5, wherein the projector controller enables the projector in response to determining a relationship between the first and second outputs satisfies the threshold.

Example 7 includes the apparatus of example 5, wherein the projector controller disables the projector in response to determining a relationship between the first and second outputs does not satisfy the threshold.

Example 8 includes the apparatus of example 5, wherein the first filter is an ultra-violet a shortpass filter and the second filter is a filter matching luminous efficiency function.

Example 9 includes the apparatus of example 1, wherein the threshold is between 0% and 10% overlap of the normalized spectral distribution graphs of light passing through the filter and a lens.

Example 10 includes the apparatus of example 1, wherein one or more of the projector, the photosensor, the lens detector, and the projector controller is coupled to a head-wearable device.

Example 11 includes the apparatus of example 1, wherein one or more of the projector, the photosensor, the lens detector, and the projector controller is integral with a head-wearable device.

Example 12 includes an apparatus comprising a head-wearable device, a projector coupled to the head-wearable device, a photosensor having a filter, a lens detector to compare an output from the photo sensor to a threshold and to detect a lens disposed on the head-wearable display device, and a projector controller to selectively enable or disable the projector based on the output from the photo-sensor.

Example 13 includes the apparatus of example 12, wherein the projector controller enables the projector in response to determining the output from the photosensor satisfies the threshold.

Example 14 includes the apparatus of example 13, wherein the threshold is a first threshold and the projector controller further dims the projector in response to the output from the photosensor satisfying a second threshold.

Example 15 includes the apparatus of example 12, wherein the projector controller disables the projector in response to determining the output from the photosensor does not satisfy the threshold.

Example 16 includes the apparatus of example 12, wherein the photosensor is a first photosensor, the filter is a first filter, and the output is a first output, further including a second photosensor having a second filter, the second photosensor producing a second output.

Example 17 includes the apparatus of example 16, wherein the projector controller enables the projector in response to determining a relationship between the first and second outputs satisfies the threshold.

Example 18 includes the apparatus of example 16, wherein the projector controller disables the projector in response to determining a relationship between the first and second outputs does not satisfy a threshold.

Example 19 includes the apparatus of example 12, wherein the threshold is between 0% and 10% overlap of the normalized spectral distribution graphs of light passing through the filter and a lens.

Example 20 includes a method comprising detecting presence of a lens in a head-wearable device including a projector and photosensor having a filter, detecting an output from the photosensor, and selectively enabling or disabling the projector based on the output from the photosensor.

Example 21 includes the method of example 20, wherein the projector is enabled in response to the output from the photosensor satisfying a threshold.

Example 22 includes the method of example 21, wherein the threshold is a first threshold and further including dimming the projector in response to the output from the photosensor satisfying a second threshold.

Example 23 includes the method of example 21, wherein the threshold is between 0% and 10% overlap of the normalized spectral distribution graphs of light passing through the filter and a lens.

Example 24 includes the method of example 20, wherein the projector is disabled in response to the output from the photosensor not satisfying a threshold.

Example 25 includes the method of example 20, wherein the photosensor is a first photosensor, the filter is a first filter and the output is a first output, further including detecting a second output of a second photosensor having a second filter.

Example 26 includes the method of example 25, wherein the first filter is an ultra-violet a shortpass filter and the second filter is a filter corresponding to luminous efficiency function.

Example 27 includes the method of example 25, further including comparing the first and second outputs to determine a relationship, enabling the projector in response to the relationship meeting a threshold, and disabling the projector in response to the relationship not meeting a threshold.

Example 28 includes a tangible machine-readable storage medium comprising instructions which, when executed, cause a machine to at least detect presence of a combiner lens in a head-wearable device by comparing a first output of a first photosensor having a first filter to a second output of a second photosensor having a second filter, and producing a relationship of the first and second outputs, determine if the relationship satisfies a threshold, enable a projector disposed on the head-wearable device in response to the relationship satisfying the threshold.

Example 29 includes the tangible machine-readable storage medium of example 28, wherein the first filter is an ultra-violet a shortpass filter and the second filter is a filter corresponding to luminous efficiency function.

Example 30 includes the tangible machine-readable storage medium of example 28 comprising instructions which, when executed, further disable the projector in response to the relationship not satisfying the threshold.

Example 31 includes the tangible machine-readable storage medium of example 28, wherein the threshold is between 0% and 10% overlap of the normalized spectral distribution graphs of light passing through the filter and a lens.

Example 32 includes the tangible machine-readable storage medium of example 28, wherein the threshold is a first threshold and further comprising instructions which, when executed, dim the projector in response to the first output satisfying a second threshold.

Example 33 includes an apparatus comprising means for projecting an image, means for filtering a light source, means for sensing the filtered light source, lens detection means to compare an output from the means for sensing to a threshold, and projector controlling means to selectively enable or disable the means for projecting based on the comparison between the output from the means for sensing and the threshold.

Example 34 includes the apparatus of example 33, wherein the projector controlling means enables the means for projecting in response to determining the output from the means for sensing satisfies the threshold.

Example 35 includes the apparatus of example 34, wherein the threshold is a first threshold and the projector controlling means further dims the means for projecting in response to the output from the means for sensing satisfying a second threshold.

Example 36 includes the apparatus of example 33, wherein the projector controlling means disables the means for projecting in response to determining the output from the means for sensing does not satisfy the threshold.

Example 37 includes the apparatus of example 33, wherein the means for sensing is a first means for sensing, the means for filtering is a first means for filtering, and the output is a first output, further including a second means for sensing having a second means for filtering a light source, the second means for sensing producing a second output.

Example 38 includes the apparatus of example 37, wherein the projector controlling means enables the means for projecting in response to determining a relationship between the first and second outputs satisfies the threshold.

Example 39 includes the apparatus of example 37, wherein the projector controlling means disables the means for projecting in response to determining a relationship between the first and second outputs does not satisfy the threshold.

Example 40 includes the apparatus of example 37, wherein the first means for filtering is an ultra-violet a shortpass filter and the second means for filtering is a filter matching luminous efficiency function.

Example 41 includes the apparatus of example 33, wherein the threshold is between 0% and 10% overlap of the normalized spectral distribution graphs of light passing through the means for filtering and a lens.

Example 42 includes the apparatus of example 33, wherein one or more of the means for projecting, the means for filtering, the means for sensing, the lens detection means, and the projector controlling means is coupled to a head-wearable device.

Example 43 includes the apparatus of example 33, wherein one or more of the means for projecting, the means for filtering, the means for sensing, the lens detection means, and the projector controlling means is integral with a head-wearable device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A projection apparatus comprising:
a projector;
a photosensor having a filter;
a lens detector to compare an output from the photosensor to a threshold, wherein the threshold is between 0% and 10% overlap of the normalized spectral distribution graphs of light passing through the filter and a lens; and
a projector controller to selectively enable or disable the projector based on the comparison between the output from the photosensor and the threshold.

2. The projection apparatus of claim 1, wherein the projector controller enables the projector in response to determining the output from the photosensor satisfies the threshold.

3. The projection apparatus of claim 2, wherein the threshold is a first threshold and the projector controller further dims the projector in response to the output from the photosensor satisfying a second threshold.

4. The projection apparatus of claim 1, wherein the projector controller disables the projector in response to determining the output from the photosensor does not satisfy the threshold.

5. The projection apparatus of claim 1, wherein the photosensor is a first photosensor, the filter is a first filter, and the output is a first output, further including
a second photosensor having a second filter, the second photosensor producing a second output.

6. The projection apparatus of claim 5, wherein the projector controller enables the projector in response to determining a relationship between the first and second outputs satisfies the threshold.

7. The projection apparatus of claim 5, wherein the projector controller disables the projector in response to determining a relationship between the first and second outputs does not satisfy the threshold.

8. The projection apparatus of claim 5, wherein the first filter is an ultra-violet A shortpass filter and the second filter is a filter matching luminous efficiency function.

9. The projection apparatus of claim 1, wherein one or more of the projector, the photosensor, the lens detector, and the projector controller is coupled to a head-wearable device.

10. The projection apparatus of claim 1, wherein one or more of the projector, the photosensor, the lens detector, and the projector controller is integral with a head-wearable device.

11. An apparatus comprising:
a head-wearable device;
a projector coupled to the head-wearable device;
a first photosensor having a first filter;
a second photosensor having a second filter, the second photosensor producing a second ouput;
a lens detector to compare a first output from the first photosensor to a threshold and to detect a lens disposed on the head-wearable device; and
a projector controller to selectively enable or disable the projector based on the output from the photosensor, wherein the projector controller disables the projector in response to determining a relationship between the first and second outputs does not satisfy a threshold.

12. The apparatus of claim 11, wherein the projector controller enables the projector in response to determining the output from the photosensor satisfies the threshold.

13. The apparatus of claim 12, wherein the threshold is a first threshold and the projector controller further dims the projector in response to the output from the photosensor satisfying a second threshold.

14. The apparatus of claim 11, wherein the projector controller disables the projector in response to determining the output from the photosensor does not satisfy the threshold.

15. The apparatus of claim 11, wherein the projector controller enables the projector in response to determining a relationship between the first and second outputs satisfies the threshold.

16. The apparatus of claim 11, wherein the threshold is between 0% and 10% overlap of the normalized spectral distribution graphs of light passing through the filter and a lens.

17. A method comprising:
detecting presence of a lens in a head-wearable device including a projector and photosensor having a filter;
detecting an output from the photosensor;
selectively enabling or disabling the projector based on the output from the photosensor, wherein then projector is enabled in response to the output from the photosensor satisfying a first threshold; and
dimming the projector in response to the output from the photosensor satisfying a second threshold.

18. The method of claim 17, wherein the first threshold is between 0% and 10% overlap of the normalized spectral distribution graphs of light passing through the filter and a lens.

19. A tangible machine-readable storage medium comprising instructions which, when executed, cause a machine to at least:
detect presence of a combiner lens in a head-wearable device by:
comparing a first output of a first photosensor having a first filter to a second output of a second photosensor having a second filter; and
producing a relationship of the first and second outputs;
determine if the relationship satisfies a threshold;
enable a projector disposed on the head-wearable device in response to the relationship satisfying the threshold.

20. The tangible machine-readable storage medium of claim 19, wherein the first filter is an ultra-violet A shortpass filter and the second filter is a filter corresponding to luminous efficiency function.

* * * * *